Patented Aug. 20, 1940

2,212,056

UNITED STATES PATENT OFFICE 2,212,056

6-CHLORO - DIPHENYL - METHANE - 2 - CARBOXYLIC ACID COMPOUNDS AND A PROCESS FOR PREPARING THE SAME

John M. Tinker, Fenwick Park, N. J., and Adrian L. Linch, Wilmington, Del., assignors to E. I. du Pont de Nemours & Company, Wilmington, Del., a corporation of Delaware No Drawing. Application September 2, 1938, Serial No. 228,116

5 Claims. (Cl. 260—515)

This invention relates to the preparation of new and valuable dyestuff intermediates, and more particularly to the preparation of 6-chloro diphenyl methane-2-carboxylic acids which may or may not carry additional substituents in the second phenyl ring.

Benzophenone-2-carboxylic acid and its substitution derivatives, such as halogen, methyl and methoxy compounds are usually prepared by the condensation of phthalic anhydride, or substituted phthalic anhydrides, with benzene or its substitution derivatives, such as chlorbenzenes, toluenes and anisol, etc. In the preparation of 6 - chloro - benzophenone - 2-carboxylic acid by condensation of 3-chloro phthalic anhydride with benzene, two isomeric derivatives are obtained. However, when these isomers are ring-closed to anthraquinone, they both give alpha-chloro anthraquinone so that in this case the presence of isomeric compounds is not material. In the preparation of further substitution derivatives, however, formation of the isomeric chloro benzoyl benzoic acids presents a serious problem, since they are very difficult to separate and to obtain in pure form. Likewise, in the preparation of 6-chloro diphenyl methane-2-carboxylic acid, if 3-chloro phthalic anhydride is employed, a mixture of isomeric chloro diphenyl methane-2-carboxylic acids will result. Hence it is impossible to obtain 6-chloro diphenyl methane-2-carboxylic acid or its further substitution derivatives in pure form starting with 3-chloro phthalic anhydride.

We have found that 6-chloro diphenyl methane-2-carboxylic acid may be readily prepared in pure form by starting with the symmetrical 3,6 - dichloro - benzophenone-2-carboxylic acid. Where the reduction is carried out with zinc and ammonia or other alkali by the process for the preparation of diphenyl methane-2-carboxylic acids, such as described in the Journal of the Chemical Society (London) 1928, page 1823, the chlorine in the 3-position is split off during the reduction giving the desired 6-chloro diphenyl methane-2-carboxylic acid which can be isolated in relatively pure form.

It is, therefore, an object of this invention to prepare 6-chloro diphenyl methane-2-carboxylic acids, which may carry in the second phenyl ring substituents of the class consisting of halogen, alkyl or alkoxy groups, in a simple and economical manner and in relatively pure form.

According to this invention, 3,6-dichloro-benzophenone-2-carboxylic acid is suspended in an aqueous ammonia solution and reduced at moderate temperatures with zinc in the presence or absence of copper salts as catalysts. The excess zinc and zinc hydroxides may be removed by filtration and the 6-chloro diphenyl methane-2-carboxylic acids may be recovered from the mother liquor by acidification; or the zinc filter cake may be extracted with hot caustic solutions and the desired product precipitated from the filtrates by acidification, depending upon the solubility of the 6-chloro diphenyl methane-2-carboxylic acid in the ammonia solution.

The following examples are given to illustrate the invention. The parts used are by weight.

Example 1

508 parts of zinc dust and 765 parts of water are stirred together until a smooth paste is obtained. 235 parts of 3,6-dichloro-benzophenone-2-carboxylic acid, 51 parts of copper sulfate and 1335 parts of 27% ammonium hydroxide are dissolved in 1345 parts of water. The mass is agitated while the temperature is raised to 70 to 80° C. over a period of 1½ hours. Heating is continued for about 14 hours at this temperature. At the end of this time, the mass is boiled until free from ammonia. 1575 parts of hot water are then added and the mass is heated to the boil. 238 parts of sodium carbonate are added to the suspension, which is then heated to the boil for 2 hours, and then filtered hot. The filtrate is run slowly into a mixture of 1185 parts of 37% hydrochloric acid and ice. The resulting suspension is filtered and the filter cake washed acid-free. About 63 parts of the 6-chloro diphenyl methane-2-carboxylic acid melting at 126 to 127° C. is obtained. An additional 35 parts of the product may be recovered by reextracting the zinc cake with a dilute solution of sodium carbonate at the boil.

Since a majority of the product remains in the zinc cake, the following alternative procedure may be employed. The zinc cake resulting by filtering the suspension prior to the addition of the sodium carbonate may be extracted with 3000 parts of 6.6% sodium hydroxide at 95 to 100° C. for 3 hours. The mass is then filtered and the filtrate is run slowly into an excess of hydrochloric acid and ice. The tar which separates crystallizes on standing, and is run off and washed acid-free. Approximately 163 parts of a crude 6-dichloro diphenyl methane-2-carboxylic acid are obtained which contains some 4-chloro phenyl phthalide and which, after recrystallization from trichloroethylene, has a melting point of 112 to 113° C. This crude product may be ring-closed to 1-chloro-10-anthrone in concentrated sulfuric acid at 20° C. On oxidation of the crude 1-chloro-10-anthrone with chromic acid in glacial acetic acid, it yields 1-chloro anthraquinone with a melting point of 160° C.

*Example 2*

508 parts of zinc dust and 765 parts of water are stirred together, in a reaction vessel equipped with a reflux condenser, until a uniform suspension is obtained. To this suspension there is added a mixture of 264 parts of 3,6,4'-trichloro-benzophenone-2-carboxylic acid (obtained by condensing 3,6-dichloro phthalic anhydride with monochlorobenzene) suspended in a solution of 1335 parts of concentrated ammonium hydroxide, 51 parts of copper sulfate and 1345 parts of water. The mass is then brought to a temperature of 70 to 80° C. over a period of 1½ hours, and held at this temperature under agitation for 14 hours. It is then cooled to room temperature, and 500 parts of 40% solution (by volume) of sodium hydroxide are added to make it alkaline to thymol phthalein. The mass is heated to a vigorous boil until the vapors are free from ammonia. This solution, which should remain alkaline to thymol phthalein, is filtered hot. The zinc residue is washed with 2000 parts of hot water, and the combined filtrates are run into a mixture of an excess hydrochloric acid and ice. The aqueous supernatent liquors are decanted from the resinous product. The resulting product is dissolved in chloroform and dehydrated by distilling off the chloroform-water binary mixture. The chloroform extract is then filtered hot, and the filtrate evaporated to dryness. A 90% yield of a mixture of 4',6-dichloro diphenyl methane-2-carboxylic acid and 4,4'-dichloro phenyl phthalide is obtained. The 4',6-dichloro diphenyl methane-2-carboxylic acid may be extracted with diethyl ether. The ether insoluble 4,4'-dichloro phenyl phthalide after recrystallization with alcohol has a melting point of 120.5 to 122.5° C.

The crude 4',6-dichloro diphenyl methane-2-carboxylic acid as obtained above upon evaporation of the diethyl ether extract can be converted by oxidation with potassium permanganate in dilute sodium hydroxide to 4',6-dichloro-benzophenone-2-carboxylic acid having a melting point of from 154 to 156° C. Ring-closure of this 4',6-dichloro diphenyl methane-2-carboxylic acid in anhydrous hydrofluoric acid gives 1,6-dichloro-10-anthrone with a melting point of 173 to 176° C. This 1,6-dichloro-10-anthrone may be oxidized with chromic acid in glacial acetic acid to 1,6-dichloro anthraquinone having a melting point of 200 to 206° C.

*Example 3*

248 parts of 3,6-dichloro-4'-methyl-benzophenone-2-carboxylic acid having a melting point of 159.6 to 160.0° C. (prepared by condensing 3,6-dichloro phthalic anhydride with toluene) are suspended in 1345 parts of water. To this paste, 1335 parts of 27% aqueous ammonia and 51 parts of copper sulfate are added. To this mixture, there is added under agitation a suspension of 508 parts of zinc dust in 765 parts of water. The mass is brought to a temperature of 70 to 80° C. over a period of 1 hour, and held at this temperature for 14 hours. It is then cooled to room temperature and filtered. The zinc filter cake is extracted with 3200 parts of 4% sodium hydroxide for 1 hour at 100° C. under agitation. It is filtered hot and the cake washed with hot water. The combined filtrates are neutralized with 1740 parts of 20° Bé. hydrochloric acid. The resulting suspension is filtered and the filter cake washed acid-free with water. The 6-chloro-4'-methyl diphenyl methane-2-carboxylic acid may be extracted from this crude product with ether. The residue consists essentially of 4-chloro-4'-methyl phenyl phthalide which, after recrystallization from alcohol and then from trichloroethylene melts at 178 to 181° C.

Other 6-chloro diphenyl methane-2-carboxylic acid compounds which carry substituents in the second phenyl ring may be obtained by substituting isomeric chloro, methyl or methoxy substituted 3,6-dichlorobenzophenone-2-carboxylic acids for those specifically mentioned in the above examples to give compounds of the general formula:

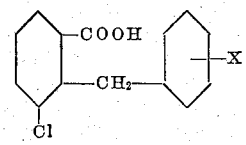

wherein X stands for a substituent of the class consisting of halogen, methyl and methoxy groups.

The reduction is preferably carried out at temperatures ranging from 70 to 80° C. At lower temperatures, the rate of the reaction is materially reduced, while at higher temperatures, an excessive loss of ammonia results, unless the reaction is carried out under pressure. While pressure may be employed for the reaction, it is not necessary, since the reaction proceeds readily at the temperatures employed in th above examples.

The concentration of ammonia may be varied within reasonable limits or other alkalis, such as sodium, potassium or barium hydroxide or trimethylamine may be substituted for the ammonia in the above reactions. Copper sulfate may be substituted by other copper salts, such as nitrate, acetate, hydroxide, etc., and although the reaction may be carried out in the absence of any copper salt as a catalyst, the speed is materially increased by the presence of this metal.

By this process, we are able to produce the 6-chloro diphenyl methane-2-carboxylic acids in relatively pure form by employing as the original starting material the symmetrical 3,6-dichloro-benzophenone-2-carboxylic acids, since only the chlorine in the 3-position is split off during the reduction. This invention permits the preparation of products which may be utilized in the synthesis of 1-chloro-10-anthrone or 1-chloro-10-anthrone which carries in the 5, 6, 7 or 8 positions substituents of the class consisting of halogen, methyl or methoxy groups.

We claim:

1. The process for producing 6-chloro diphenyl methane-2-carboxylic acids which comprises subjecting a 3,6-dichloro-benzophenone-2-carboxylic acid compound to reduction with zinc in the presence of an alkali.

2. Compounds of the class consisting of:

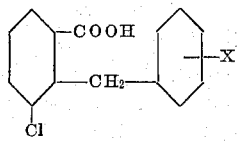

wherein X stands for a substituent of the class consisting of hydrogen, halogen, methyl and methoxy groups.

3. 6-chloro diphenyl methane-2-carboxylic acid.

4. 6,4'-dichloro diphenyl methane-2-carboxylic acid.

5. 6-chloro-4'-methyl diphenyl methane-2-carboxylic acid.

JOHN M. TINKER.
ADRIAN L. LINCH.